US011425903B2

(12) United States Patent
Van Der Laan et al.

(10) Patent No.: US 11,425,903 B2
(45) Date of Patent: Aug. 30, 2022

(54) STABLE LIQUID FORMULATIONS OF PROTHIOCONAZOLE

(71) Applicant: UPL LTD, West Bengal (IN)

(72) Inventors: Alexander Cornelis Van Der Laan, Vondelingenplaat/Rotterdam (NL); Rajan Shirsat, Mumbai (IN); Jaidev Rajnikant Shroff, Dubai (AE); Vikram Rajnikant Shroff, Dubai (AE)

(73) Assignee: UPL LTD, West Bengal (IN)

( * ) Notice: Subject to any disclaimer, the term of this patent is extended or adjusted under 35 U.S.C. 154(b) by 175 days.

(21) Appl. No.: 16/613,846

(22) PCT Filed: May 11, 2018

(86) PCT No.: PCT/IB2018/053292
§ 371 (c)(1),
(2) Date: Nov. 15, 2019

(87) PCT Pub. No.: WO2018/211383
PCT Pub. Date: Nov. 22, 2018

(65) Prior Publication Data
US 2020/0163330 A1 May 28, 2020

(30) Foreign Application Priority Data
May 18, 2017 (IN) .............................. 201731017542

(51) Int. Cl.
A01N 25/04 (2006.01)
A01N 25/20 (2006.01)
A01N 43/22 (2006.01)
A01N 25/22 (2006.01)
A01N 43/653 (2006.01)
A01N 59/20 (2006.01)
(52) U.S. Cl.
CPC ............. A01N 25/22 (2013.01); A01N 25/04 (2013.01); A01N 43/653 (2013.01); A01N 59/20 (2013.01)

(58) Field of Classification Search
CPC .............................. A01N 43/653; A01N 59/20
See application file for complete search history.

(56) References Cited

U.S. PATENT DOCUMENTS

| 5,789,430 A | 8/1998 | Jautelat et al. | |
|---|---|---|---|
| 8,656,680 B2 | 2/2014 | James | |
| 8,658,680 B2 | 2/2014 | Rosa et al. | |
| 9,788,544 B2 * | 10/2017 | Oliveira | ................. A01N 59/02 |
| 2014/0147691 A1 * | 5/2014 | Humphrey | ............... B27K 3/08 |
| | | | 428/541 |

FOREIGN PATENT DOCUMENTS

| AU | 2008229854 A1 * | 10/2008 | ............. A01N 37/50 |
|---|---|---|---|
| AU | 2014356115 B2 * | 8/2018 | ............. A01N 25/00 |
| CN | 104322558 | 2/2015 | |
| CN | 104322558 A * | 2/2015 | |
| CN | 104604920 | 5/2015 | |
| CN | 104621168 | 5/2015 | |
| CN | 105638773 | 6/2016 | |
| WO | WO-2015070567 A1 * | 5/2015 | ............. A01N 47/38 |

OTHER PUBLICATIONS

International Search Report and Written Opinion; International Application No. PCT/IB2018/053292; International Filing Date May 11, 2018; dated Jun. 19, 2018; 11 pages.
Anonymous; "Amisulbrom" [Pesticide Fact Sheet]; United States Environmental Protection Agency, Washington, D.C. USA; Sep. 16, 2011; 16 pages.
Anonymous; "FRAC Code List"; Fungicide Resistance Action Committee; Basel, Switzerland; 2021; 17 pages.

* cited by examiner

Primary Examiner — Alton N Pryor
(74) Attorney, Agent, or Firm — Cantor Colburn LLP

(57) ABSTRACT

A formulation comprising prothioconazole and a stabilizing amount of a transition metal salt, optionally a co-pesticide, optionally two co-pesticides, a process for the preparation thereof, a method of use thereof and kit comprising the components thereof is disclosed.

13 Claims, No Drawings

STABLE LIQUID FORMULATIONS OF PROTHIOCONAZOLE

CROSS REFERENCE TO RELATED APPLICATIONS

This application is a National Stage application of PCT/IB2018/053292 filed on May 11, 2018, which claims the benefit of Indian Application No. 201731017542, filed on May 18, 2017, both of which are incorporated by reference in their entirety herein.

TECHNICAL FIELD OF THE INVENTION

The present invention relates to stable agrochemical liquid formulations comprising prothioconazole.

BACKGROUND OF THE INVENTION

Fungi are one of the major causes for crop loss worldwide and hence fungicides are considered as an important class of pesticides. Fungicides are specific types of pesticides that are used widely to control fungal diseases by inhibiting or killing the fungus causing the diseases.

Triazoles are one of the largest class of fungicides and are found to be highly efficient as broad spectrum fungicide. A triazole fungicide of particular importance is 2-[2-(1-chlorocyclopropyl)-3-(2-chlorophen-yl)-2-hydroxypropyl]-2,4-dihydro-[1,2,4-]-trazole-3-thione developed by Bayer. The common name for this triazolinthione fungicide is prothioconazole. Prothioconazole is a sterol demethylation (ergosterol biosynthesis) inhibitor and is used in agriculture as a fungicide.

U.S. Pat. No. 5,789,430 discloses prothioconazole and its use as microbicides in plant protection. It is a systemic fungicide with protective, curative, eradicative and long-lasting activity. It is widely used for control of diseases such as eyespot (*Pseudocercosporella herpotrichoides*), *Fusarium* ear blight (*Fusarium* spp., *Microdochium nivale*), leaf blotch diseases (*Septoria tritici, Leptosphaeria nodorum, Pyrenophora* spp., *Rhynchosporium secalis*, etc.), rust (*Puccinia* spp.) and powdery mildew (*Blumeria graminis*), by foliar application, in wheat, barley and other crops. It used in seed dressing as well, for control of *Ustilago* spp., *Tilletia* spp., *Fusarium* spp. and *Microdochium nivale*.

Prothioconazole, being a water insoluble active ingredient, it may be either formulated with organic solvents and emulsifiers (emulsifiable concentrates) or as aqueous dispersions and other inert ingredients. Due to cost as well as negative environmental impact on using organic solvents, emulsifiable concentrates are less preferred.

U.S. Pat. No. 8,658,680 discloses that in aqueous dispersions, prothioconazole undergoes degradation and is chemically unstable particularly when it is formulated at low concentration, thereby reducing the shelf life of the formulations. Stability of the formulation is achieved by the addition of sulphur containing compound. Due to the stringent guidelines by various regulatory agencies on the permissible limit of sulphur compounds in agricultural formulations, it is often found to be ineffective in rendering the required stability and to maintain the active ingredient content within the acceptable limits.

The problems associated with the chemical and physical stability of formulations are aggravated when it is required to develop formulations comprising more than one active ingredients. In case when water insoluble prothioconazole is required to be combined with another water insoluble active ingredient, formulation development becomes tricky.

Therefore it is challenging to develop stable prothioconazole liquid formulations wherein the active content of prothioconazole is maintained in the formulation even after long periods of storage.

Objects of the Invention

An object of the present invention is to provide stable agrochemical liquid formulations comprising prothioconazole.

Another objection of the present invention is to provide a process for producing stable liquid formulations comprising prothioconazole wherein the chemical degradation of prothioconazole is prevented.

Another objection of the present invention is to provide liquid formulations comprising prothioconazole which do not degrade during long periods of storage. Yet another object of the present invention is to provide stable liquid formulations comprising prothioconazole and at least one co-pesticide.

The present invention meets at least one, and preferably all, of the above mentioned objectives by way of the following description.

SUMMARY OF THE INVENTION

The present invention provides a stable agrochemical liquid formulation comprising prothioconazole and a stabilizing amount of a transition metal salt.

The present invention provides a process for producing a stable liquid prothioconazole formulation wherein chemical stabilization of prothioconazole is effected, said process comprising interspersing prothioconazole and a stabilizing amount of transition metal salt in an aqueous medium.

Further, the invention provides stable agrochemical liquid formulations comprising prothioconazole, stabilizing amount of a transition metal salt and at least one co-pesticide.

The present invention further provides a method of controlling unwanted pests said method comprising applying an effective amount of stable liquid prothioconazole formulations according to the present invention to the pests or to their habitat.

DETAILED DESCRIPTION

The present invention provides stable liquid formulations comprising prothioconazole.

According to various regulatory requirements, the active ingredient present/declared in a given formulation should not vary beyond acceptable limits during storage to ensure safety as well as the intended performance of a particular active ingredient.

Attempts were made by the inventors of the present invention to control the chemical degradation of prothioconazole in liquid formulations which was observed especially in low concentration liquid formulations. The problem of chemical degradation of prothioconazole in liquid formulations was surprisingly solved by admixing prothioconazole with a transition metal salt.

Thus it was found surprisingly that stable liquid formulations of prothioconazole can be prepared by interspersing it with at least one transition metal salt.

Most surprisingly, it has been found out that the inventive formulations of the present invention requires a stabilizing amount of a transition metal salt to prevent chemical degradation of prothioconazole.

With respect to the present invention, the term 'stable liquid formulation' refers to a liquid formulation which is stable physically and chemically. The term 'chemical stability' as used herein represents a formulation containing one or more active ingredients wherein the active ingredient/s does not chemically degrade or decompose beyond acceptable limit. The term 'physical stability' as used herein represents a formulation containing one or more active ingredients wherein there is no significant layer separation or settling of solid particles occurs during/after storage.

In some embodiments, the invention provides chemically and physically stable liquid formulation of prothioconazole.

With respect to the present invention, prothioconazole refers to 2-[2-(1-chlorocyclopropyl)-3-(2-chlorophenyl)-2-hydroxypropyl]-1,2-dihydro-3H-1,2,4-triazole-3-thione, its isomers, mixture of isomers and crystalline modifications.

In some other embodiments the invention provides stable aqueous formulation of prothioconazole.

In certain other embodiments the invention provides stable aqueous dispersion of prothioconazole.

In one embodiment there is provided aqueous dispersion of prothioconazole wherein prothioconazole does not degrade beyond acceptable limit.

Accordingly, in some embodiments the present invention provides a formulation comprising prothioconazole and a transition metal salt.

In some embodiments, in aqueous dispersions, the presence of transition metal salt controlled the degradation of prothioconazole.

In certain other embodiments, in aqueous dispersions, chemical stabilization of prothioconazole is effected by the presence of a transition metal salt.

In some embodiments the invention provides aqueous formulation of prothioconazole wherein prothioconazole is present in low concentration.

In an embodiment of the inventive formulations of the present invention, prothioconazole is present in amount from about 0.01% to about 30% by weight of the formulation. Preferably, prothioconazole content in the formulations is varied from about 0.1% to about 20% by weight of the formulation.

In an embodiment the transition metal salt that is useful in stabilizing prothioconazole includes salts of transition metals comprising Cu, Fe, Zn, Mn, Co and Ni.

In certain embodiments examples of the salts of transition metals include nitrates, carbonates, sulfates, halides and hydroxides wherein the transition metals are either in monovalent, divalent or trivalent state.

In an embodiment, the transition metal salt is selected from but not limited to copper nitrate, cuprous nitrate, copper nitrite, cuprous sulfite, cupric sulfite, copper sulfate, copper carbonate, copper chloride, cuprous chloride, copper bromide, copper iodide, copper fluoride, copper hydroxide, ferric nitrate, ferrous nitrate, ferric nitrite, ferrous nitrite, ferric carbonate, ferric chloride, ferrous chloride, ferric bromide, ferric iodide, ferric fluoride, ferric hydroxide, zinc nitrate, zinc nitrite, zinc sulfate, zinc sulfite, zinc carbonate, zinc chloride, zinc bromide, zinc iodide, zinc fluoride, zinc hydroxide manganese nitrate, manganese nitrite, manganese sulfite, manganese sulfate, manganese carbonate, manganese chloride, manganese bromide, manganese iodide, manganese fluoride, manganese hydroxide, cobalt nitrate, cobalt nitrite, cobalt sulfite, cobalt sulfate, cobalt carbonate, cobalt chloride, cobalt bromide, cobalt iodide, cobalt fluoride, cobalt hydroxide, nickel nitrate, nickel nitrite, nickel sulfite, nickel sulfate, nickel carbonate, nickel chloride, nickel bromide, nickel iodide, nickel fluoride and nickel hydroxide.

In some embodiments the transition metal salt is required in an amount effective to maintain chemical stability to prothioconazole.

In another embodiment, the transition metal salt is present in a stabilizing amount to prevent chemical degradation of prothioconazole.

In yet another embodiment, the stabilizing amount of transition metal salt is at least 0.01% by weight of the formulation.

In certain other embodiments, the transition metal salt is present at least in an amount about 0.01% by weight of the formulation.

In certain other embodiments, the transition metal salt is present in an amount from about 0.01% to about 10% by weight of the formulation.

The innovative formulations of the present invention further comprises at least one co-pesticide.

In some embodiments, the co-pesticide is selected from but not limited to herbicide, insecticide, insect growth regulator, nematicide, termiticide, molluscicide, bactericide, insect repellent, animal repellent, antimicrobial, fungicide, disinfectant and sanitizer.

In some preferred embodiments, the co-pesticide is selected from fungicides, antimicrobials and insecticides.

In some more preferred embodiments, the co-pesticide is selected from fungicides.

In some most preferred embodiments, the fungicide is selected from but not limited to dithiocarbamate fungicides, demethylation inhibitor, quinone outside inhibitor, succiniate dehydrogenase inhibitor and quinone inside inhibitor.

In an embodiment, the dithiocarbamate fungicides contain a dithiocarbamate molecular moiety and are selected from amobam, asomate, azithiram, carbamorph, cufraneb, cuprobam, disulfiram, ferbam, metam, nabam, tecoram, thiram, urbacide, ziram, dazomet, etem, milneb, mancopper, mancozeb, maneb, metiram, polycarbamate, propineb and zineb.

In a preferred embodiment, the dithiocarbamate fungicide is mancozeb.

In another embodiment, the quinone outside inhibitor is selected from strobilurin fungicides.

In another embodiment, the strobilurin fungicide is selected from but not limited to azoxystrobin, kresoxim-methyl, picoxystrobin, pyraclostrobin, and trifloxystrobin In an embodiment, the demethylation fungicide is selected from triazole fungicides.

In another embodiment, the triazole fungicides are selected from but are not limited to cyproconazole, flusilazole, flutriafol, metconazole, myclobutanil, propiconazole, tebuconazole, and tetraconazole.

In an embodiment, the succiniate dehydrogenase inhibitor is selected from benzovindiflupyr, bixafen, fluxapyroxad, furametpyr, isopyrazam, penflufen, penthiopyrad, sedaxane, boscalid, thifluzamide, carboxin, oxycarboxin, fenfuram, fluopyram, isofetamid, benodanil, flutolanil and mepronil.

Accordingly, in certain embodiments, there is provided stable liquid formulations comprising prothioconazole, stabilizing amount of a transition metal salt and a dithiocarbamate fungicide.

In certain preferred embodiments, there is provided stable liquid formulations comprising prothioconazole, stabilizing amount of a transition metal salt and mancozeb.

In certain embodiments, the formulations of the present invention further comprises at least two co-pesticides.

In an embodiment, the co-pesticides are selected from dithiocarbamate fungicides, demethylation inhibitor, quinone outside inhibitor, succiniate dehydrogenase inhibitor and quinone inside inhibitor.

In a preferred embodiment, the co-pesticides are selected from dithiocarbamate fungicides and quinone outside inhibitor.

In another embodiment, the quinone outside inhibitor is selected from strobilurin fungicides.

In another embodiment, the strobilurin fungicide is selected from but not limited to azoxystrobin, kresoximmethyl, picoxystrobin, pyraclostrobin, and trifloxystrobin.

Accordingly, in certain embodiments, there is provided stable liquid formulations comprising prothioconazole, stabilizing amount of a transition metal salt, a dithiocarbamate fungicide and a strobilurin fungicide.

In an embodiment, there is provided stable liquid formulations comprising prothioconazole, stabilizing amount of a transition metal salt, mancozeb and azoxystrobin.

In another embodiment, there is provided stable liquid formulations comprising prothioconazole, stabilizing amount of a transition metal salt, mancozeb and kresoximmethyl.

In another embodiment, there is provided stable liquid formulations comprising prothioconazole, stabilizing amount of a transition metal salt, mancozeb and picoxystrobin.

In another embodiment, there is provided stable liquid formulations comprising prothioconazole, stabilizing amount of a transition metal salt, mancozeb and pyraclostrobin.

In another embodiment, there is provided stable liquid formulations comprising prothioconazole, stabilizing amount of a transition metal salt, mancozeb and trifloxystrobin.

According to the present invention, there is provided a process for producing stable liquid formulation of prothioconazole.

In a preferred embodiment the liquid formulation is an aqueous formulation.

In an embodiment, there is provided a process for chemically stabilizing prothioconazole in aqueous formulations.

In another embodiment, there is provided a process for chemically stabilizing low concentration aqueous formulations of prothioconazole.

In some other embodiments, there is provided a process for chemically stabilizing aqueous dispersions of prothioconazole.

In another embodiment there is provided a process for chemically stabilizing aqueous dispersions of prothioconazole by effecting an interaction between prothioconazole and a transition metal salt.

In an embodiment, there is provided a process for producing stable liquid formulation of prothioconazole, said process comprising the steps of
a) dispersing prothioconazole in water to produce an aqueous dispersion of prothioconazole; and
b) interspersing a transition metal salt to the aqueous dispersion in an amount effective to maintain the dispersion stable, wherein the transition metal salt is selected from salts of transition metals comprising Cu, Fe, Zn, Mn, Co and Ni.

In certain other embodiments, the salts of transition metals used in the process may be selected from nitrates, carbonates, sulfates, halides and hydroxides.

In some embodiments, in the process of stabilization of prothioconazole, transition metal salt is required in an amount effective to maintain chemical stability to prothioconazole.

In some other embodiments, in the process of stabilization of prothioconazole, transition metal salt is present at least in an amount about 0.01% by weight of the formulation.

In certain other embodiments, the transition metal salt is required in an amount from about 0.01% to about 10% by weight of the formulation.

In some embodiments, the formulations according to the present invention may be provided as different formulation types selected from suspension concentrate, suspo-emulsion, micro-dispersion, micro-emulsion or a dilutable dispersion.

In certain embodiments, the formulations of the present invention comprise a continuous aqueous phase.

In certain other embodiments, the formulations of the present invention comprise a non-continuous organic phase.

According to the present invention, there is provided a process for producing stable liquid formulation of prothioconazole, comprising prothioconazole, a stabilizing amount of transition metal salt and at least one co-pesticide.

In certain other embodiments, there is provided a process for producing stable liquid formulation of prothioconazole, said process comprising the steps of:
a) dispersing prothioconazole in water to produce an aqueous dispersion of prothioconazole;
b) interspersing a transition metal salt to the aqueous dispersion in an amount effective to maintain the aqueous dispersion stable wherein the transition metal salt is selected from salts of transition metals comprising Cu, Fe, Zn, Mn, Co and Ni; and
c) introducing at least one co-pesticide to the aqueous dispersion.

In some embodiments, the steps (b) and (c) can be performed in any order.

In certain embodiments, the co-pesticide is introduced as an aqueous dispersion or as a solution in a suitable solvent.

In some embodiments, the suitable solvent is water.

In some embodiments the process include solvents commonly used in agricultural formulations.

In certain other embodiments, suitable solvents that may be used in this process include but not limited to alcohols, ketones, aliphatic or aromatic hydrocarbons, chlorinated hydrocarbons, amide solvents vegetable oils, their derivatives or mixtures thereof.

The stable liquid formulations of the present invention may optionally include other agrochemically acceptable excipients. Examples are surfactants such as dispersing agents, wetting agents, emulsifiers, suspension agents, defoamers, penetrants, antioxidants, stabilizers, pH adjustors, fertilizers, rheology modifiers or thickeners, inerts and combinations thereof.

In an embodiment, surfactants that can be used as wetting agents and/or dispersing agents include sulfosuccinates, naphthalene sulfonates, sulfated esters, phosphate esters, sulfated alcohol, alkyl benzene sulfonates polycarboxylates, naphthalene sulfonate condensates, phenol sulfonic acid condensates, lignosulfonates, methyl oleyl taurates and polyvinyl alcohols. Further it is possible to use other surfactants known in the art without departing from the scope of the invention.

In an embodiment of the present invention, the composition can comprise pH modifiers. Suitable pH modifiers comprise buffers. Examples are alkali metal salts of weak inorganic or organic acids.

In an embodiment of the present invention, the compositions comprise rheology modifier (or a thickener). Suitable compounds are all those compounds usually employed for this purpose in agrochemical compositions. Examples include bentonites, attapulgites, polysaccharides, xanthan gum and kelzan gum.

In another embodiment of the present invention, the compositions comprise antifreeze agents. Suitable antifreeze agents are liquid polyols, for example ethylene glycol, propylene glycol or glycerol.

In another embodiment of the present invention, the compositions comprise defoamers selected from non-silicone or silicone based antifoaming agents.

Further, the present invention provides a method of controlling unwanted pests said method comprising applying an effective amount stable liquid prothioconazole formulation according to the present invention to the pests or to their habitat.

In an embodiment, there is provided a method of controlling unwanted pests said method comprising applying an effective amount stable liquid formulation of prothioconazole said formulation comprising prothioconazole and a stabilizing amount of a transition metal salt.

In an embodiment, the stable liquid formulation of the present invention is used as a fungicide.

In another embodiment, there is a method of controlling unwanted fungi, said method comprising applying a fungicidally effective amount of stable liquid formulation of prothioconazole said formulation comprising prothioconazole and a stabilizing amount of a transition metal salt.

In some embodiments, the formulations according to the present invention can be used for pest control on plants, plant parts, seeds, seedlings, or on soil.

In some embodiments, there is provided a method of controlling unwanted pests said method comprising applying an effective amount stable liquid formulation of prothioconazole to the pests or to their habitat, said formulation comprising prothioconazole, a stabilizing amount of a transition metal salt and a co-pesticide.

In some other embodiments, the stable liquid formulation comprising prothioconazole, a stabilizing amount of a transition metal salt and a co-pesticide is used as a fungicide.

The formulations of the present invention may be sold as a pre-mix composition or a kit of parts such that individual components of the formulations may be mixed before spraying.

Therefore, in an aspect, the present invention provides a kit comprising prothioconazole component and component comprising a stabilizing amount of a transition metal salt.

In an embodiment, the components of the kit are instructed to be mixed before being used.

Thus, in this embodiment, the kit of the invention also comprises an instruction manual.

In another embodiment, the kit comprises prothioconazole, a stabilizing amount of a transition metal salt and at least one co-pesticide.

The present invention is now illustrated by the following examples.

EXAMPLES

Example 1

A stable liquid formulation of prothioconazole according to the present invention as given below:

| Ingredient | Quantity (gm/Kg) |
|---|---|
| Prothioconazole | 55.0 |
| Sodium lignosulfonate | 40.0 |
| Monoethylene glycol | 75.0 |
| Copper sulfate | 2.5 |
| defoamer | 3.0 |
| Potassium carbonate | 8.0 |
| Xanthan gum | 1.0 |
| water | q.s. |

Procedure: Prothioconazole was mixed with monoethylene glycol and sodium lignosulfonate. While stirring the mixture, defoamer and xanthan gum were added. Further copper sulfate and potassium carbonate were added and stirred until the mixture became homogenous.

The formulation was found to be stable and no degradation of prothioconazole was observed after keeping at 54° C. for 14 days.

Example 2

A stable liquid formulation of prothioconazole and mancozeb according to the present invention is prepared as given below:

Part 1: Prothioconazole 385 g/kg SC premix

| Ingredients | Quantity (g/Kg) |
|---|---|
| Prothioconazole (98.5%) | 387.6 |
| Monoethyleenglycol | 67.0 |
| Sodium Lignosulfonate | 37.9 |
| Defoamer | 8.2 |
| Xanthan Gum | 1.2 |
| Water | q.s |

Procedure: Prothioconazole was mixed with monoethylene glycol and sodium lignosulfonate. While stirring the mixture, defoamer and xanthan gum were added. Stirring was continued until the mixture became homogenous.

Part 2: Mancozeb 430 g/kg premix

| Ingredients | Quantity g/kg |
|---|---|
| Mancozeb (85%) | 508.7 |
| Monoethyleenglycol | 36.0 |
| Sodium Lignosulfonate | 32.3 |
| Defoamer | 2.9 |
| Water | q.s |

Procedure: Mancozeb was mixed with monoethylene glycol and sodium lignosulfonate. While stirring the mixture, defoamer and xanthan gum were added. Stirring was continued until the mixture became homogenous Part 3: Stable SC formulation of Prothioconazole+Mancozeb 40+272 g/kg

| Ingredients | Recipe g/kg |
|---|---|
| Mancozeb (85%) | 320.4 |
| Prothioconazole (98.5%) | 41.3 |

-continued

| Ingredients | Recipe g/kg |
|---|---|
| Monoethyleenglycol | 29.8 |
| Sodium Lignosulfonate | 24.4 |
| Defoamer | 2.7 |
| Potassium carbonate | 13.7 |
| Copper sulfate | 15.0 |
| Xanthan Gum | 1.9 |
| Water | q.s |

Procedure: To the (premix) of prothioconazole SC, copper sulfate was added. The mixture was stirred, followed by the addition of potassium carbonate to adjust the pH to 6-7. Further, mancozeb SC (premix), other surfactants, defoamer and xanthan gum were added and the mixture was homogenized by stirring.

Chemical Stability of Liquid Formulation of Prothioconazole and Mancozeb while Using Copper Salts:

The liquid formulations prepared according to the present invention were tested to find out the chemical stability of prothioconazole over a period of time. Formulations (Example 4-8) were prepared at varied quantity of prothioconazole, mancozeb and transition metal salts. The samples were prepared as per the process given in example 2. The samples were kept at 54° C. for 14 days and then analyzed to find out the content of prothioconazole present in the formulations. A control experiment (Example 3) has been tested under identical conditions for comparing the results. Results are summarized in the below table (Table 1):

TABLE 1

| | | Quantity relative to | Content prothioconazole (g/kg) at 54° C. | | |
|---|---|---|---|---|---|
| Example No. | Transition metal salt | prothioconazole (equ) | 0 days | 14 days | % degradation |
| 3 | Control | 0.0 | 40.4 | 36.4 | 10.0 |
| 4 | $CuSO_4$ | 0.50 | 39.5 | 39.7 | 0.0 |
| 5 | $CuSO_4$ | 0.25 | 39.6 | 38.4 | 3.0 |
| 6 | $Cu(OH)_2$ | 0.7 | 37.6 | 36.7 | 2.5 |
| 7 | $Cu(OH)_2$ | 0.35 | 38.1 | 36.8 | 3.5 |
| 8 | $Cu(OH)_2$ | 0.2 | 38.1 | 36.6 | 4.0 |

It has been found out that the presence of copper salt stabilizes prothioconazole in aqueous dispersions. The problem of degradation of prothioconazole is successfully solved by adding transition metal salt to aqueous formulations of prothioconazole.

Chemical Stability of Liquid Formulation of Prothioconazole and Mancozeb while Using Salts of Manganese, and Iron:

The liquid formulations prepared according to the present invention were tested to find out the chemical stability of prothioconazole over a period of time. Formulations (Example 9-11) were prepared at varied quantity of prothioconazole, mancozeb and transition metal salts. The samples were prepared as per the procedure given in example 2. The samples were kept at 40° C. for 21 days and then analyzed to find out the content of prothioconazole present in the formulations. The results are summarized in the below table (Table 2):

TABLE 2

| | | Quantity relative to | Content prothioconazole (g/kg) at 40° C. | | |
|---|---|---|---|---|---|
| Example No. | Transition metal salt | prothioconazole (equ) | 0 days | 21 days | % degradation |
| 9 | $MnSO_4$ | 1.2 | 42.1 | 40.7 | 3.5 |
| 10 | $FeSO_4$ | 0.5 | 42.9 | 41.4 | 3.5 |
| 11 | $ZnSO_4$ | 0.67 | 43.0 | 41.5 | 3.5 |

The formulations of the present invention were found to be stable. The chemical degradation of prothioconazole in these formulations were found to be less than 4% which is within acceptable limits.

Example 12:
Prothioconazole+Mancozeb+Pyraclostrobin SC

A stable liquid formulation of prothioconazole, mancozeb and pyraclostrobin, according to the present invention is prepared as given below:

Part 1: Prothioconazole+Pyraclostrobin SC premix

| Ingredients | Quantity(g/kg) |
|---|---|
| Prothioconazole (98.7%) | 188.7 |
| Pyraclostrobin (99%) | 235.0 |
| Monopropylene glycol | 68.8 |
| Sodium lignosulfonate | 37.3 |
| Defoamer | 8.5 |
| Thickener | 1.8 |
| Water | Q.S. |

Procedure: Prothioconazole and pyraclostrobin were mixed with monopropylene glycol, sodium lignosulfonate, defoamer and a part of the water. The mixture was bead milled until a required particle size was achieved. To the premix the thickener was added and stirring was continued until the mixture became homogenous.

Part 2: Mancozeb SC premix

| Ingredients | Quantity (g/kg) |
|---|---|
| Mancozeb 85% | 504.7 |
| Monopropylene glycol | 36.4 |
| Sodium lignosulfonate | 32.9 |
| defoamer | 7.1 |
| Water | Q.S. |

Procedure: Mancozeb was mixed with monopropylene glycol, antifoam, water and sodium lignosulfonate. Stirring was continued until the mixture became homogenous.

Part 3: SC formulation of Prothioconazole+Mancozeb+Pyraclostrobin SC

| Ingredient | Quantity (g/kg) |
|---|---|
| Mancozeb SC | 699.3 |
| Prothioconazole/Pyraclostrobin SC | 214.7 |
| Copperhydroxide | 8.4 |
| Potassium carbonate | 3.5 |
| Thickener | 1.1 |
| Water | q.s. |

Procedure: To the (premix) of prothioconazole+pyraclostrobin SC, copper hydroxide was added. The mixture was stirred, followed by the addition of mancozeb SC (premix). Potassium carbonate was added to adjust the pH to 6-7. To the mixture, the thickener was added and stirring was continued until a homogenous mixture was obtained.

Chemical Stability of Liquid Formulation of Prothioconazole, Pyraclostrobin and Mancozeb while Using Copper Salts:

The liquid formulations prepared according to the present invention were tested to find out the chemical stability of Prothioconazole over a period of time. Formulations (Example 14-18) of prothioconazole, pyraclostrobin and mancozeb and were prepared at varied quantity of transition metal salts. The samples were prepared as per the process given in example 12. The samples were kept at 54° C. for 14 days and then analyzed to find out the content of prothioconazole present in the formulations. A control experiment (Example 13) has been tested under identical conditions for comparing the results. Results are summarized in the below table (Table 3):

TABLE 3

| Example No. | Transition metal salt | Quantity relative to prothioconazole (equ) | Content prothioconazole (g/kg) at 54° C. | | |
|---|---|---|---|---|---|
| | | | 0 days | 14 days | % degradation |
| 13 | Control | 0.0 | 39.0 | 33.8 | 13.3 |
| 14 | Cu(OH)$_2$ | 0.5 | 39.3 | 36.9 | 6.2 |
| 15 | Cu(OH)$_2$ | 0.7 | 38.7 | 37.9 | 2.7 |
| 16 | Cu(OH)$_2$ | 1.0 | 38.9 | 38.5 | 0.6 |
| 17 | CuSO$_4$ | 0.7 | 38.8 | 37.7 | 2.8 |
| 18 | CuSO$_4$ | 1.0 | 38.5 | 37.7 | 2.3 |

As evident from the table, the % degradation of prothioconazole is effectively controlled by using transition metal salts. When prothioconazole is combined with more than one co-pesticides, it is important to maintain stability of prothioconazole so as to give the expected efficacy. Inventors of the present invention successfully achieved the required stability by intermixing prothioconazole with a transition metal salt.

The instant invention is more specifically explained by examples given above. However, it should be understood that the scope of the present invention is not limited by the examples in any manner. It will be appreciated by any person skilled in this art that the present invention includes the given examples and further can be modified and altered without departing from the novel teachings and advantages of the invention which are intended to be included within the scope of the invention.

The invention claimed is:

1. A formulation comprising
   prothioconazole, wherein said prothioconazole is present in amount from about 0.01% to about 30% by weight of the total weight of the formulation, -and
   a stabilizing amount of a transition metal salt; wherein said transition metal salt consists of Cu, Fe, Zn, Mn, Co, or Ni, and a nitrate, carbonate, sulfate, halide or hydroxide; wherein said transition metals are in a monovalent, divalent or trivalent state; and wherein said transition metal salt is present in an amount from about 0.01% to 10% by weight of the total weight of the formulation.

2. The formulation of claim 1, further comprising at least one co-pesticide.

3. The formulation of claim 2, wherein said co-pesticide is selected from dithiocarbamate fungicides, demethylation inhibitors, quinone outside inhibitors, succiniate dehydrogenase inhibitors, and quinone inside inhibitors.

4. The formulation of claim 2, wherein said formulation comprises at least two co-pesticides.

5. The formulation of claim 4, wherein said co-pesticides are selected from dithiocarbamate fungicides, demethylation inhibitors, quinone outside inhibitors, succiniate dehydrogenase inhibitors, and quinone inside inhibitors.

6. The formulation of claim 3, wherein said dithiocarbamate fungicides comprise mancozeb.

7. The formulation of claim 3, wherein said quinone outside inhibitors comprise a strobilurin fungicide.

8. A process for producing a formulation according to claim 1, said process comprising interspersing the prothioconazole and the stabilizing amount of the transition metal salt in an aqueous medium.

9. The process of claim 8, wherein said process comprises the steps of:
   a) dispersing the prothioconazole in water to produce an aqueous dispersion of prothioconazole; and
   b) interspersing the transition metal salt in the aqueous dispersion in an amount effective to maintain a stable aqueous dispersion.

10. The process of claim 9, further comprising introducing at least one co-pesticide into the stable aqueous dispersion.

11. A method of controlling unwanted pests said method comprising applying to a locus of unwanted pests an effective amount of the formulation of claim 1 to the pests or to their habitat.

12. A method of claim 11, wherein said formulation is used as fungicide.

13. A method of claim 11, wherein said formulation further comprises at least one co-pesticide.

* * * * *